(12) United States Patent
Baranyai et al.

(10) Patent No.: US 11,705,564 B2
(45) Date of Patent: Jul. 18, 2023

(54) FUEL CELL DEVICE AND METHOD OF MONITORING AND STRUCTURALLY ADAPTING A FUEL CELL DEVICE

(71) Applicant: AUDI AG, Ingolstadt (DE)

(72) Inventors: Markus Baranyai, Bad Wimpfen (DE); Markus Ruf, Waldstetten (DE)

(73) Assignee: Audi AG, Ingolstadt (DE)

( * ) Notice: Subject to any disclaimer, the term of this patent is extended or adjusted under 35 U.S.C. 154(b) by 152 days.

(21) Appl. No.: 17/268,918

(22) PCT Filed: Jul. 8, 2019

(86) PCT No.: PCT/EP2019/068226
§ 371 (c)(1),
(2) Date: Feb. 16, 2021

(87) PCT Pub. No.: WO2020/035216
PCT Pub. Date: Feb. 20, 2020

(65) Prior Publication Data
US 2021/0344026 A1    Nov. 4, 2021

(30) Foreign Application Priority Data
Aug. 17, 2018  (DE) ............... 10 2018 213 912.1

(51) Int. Cl.
*H01M 8/04746* (2016.01)
*H01M 8/0202* (2016.01)
*H01M 8/248* (2016.01)

(52) U.S. Cl.
CPC ..... *H01M 8/04753* (2013.01); *H01M 8/0269* (2013.01); *H01M 8/248* (2013.01)

(58) Field of Classification Search
None
See application file for complete search history.

(56) References Cited

U.S. PATENT DOCUMENTS

| 9,190,693 B2 | 11/2015 | Sridhar et al. |
| 2002/0031692 A1 | 3/2002 | Fuglevand et al. |
| 2003/0180603 A1 | 9/2003 | Richards |
| 2006/0024545 A1* | 2/2006 | Osenar ............... H01M 8/0258 429/535 |

(Continued)

FOREIGN PATENT DOCUMENTS

| DE | 100 06 781 A1 | 3/2002 |
| DE | 10 2006 053 978 A1 | 5/2008 |

(Continued)

*Primary Examiner* — Haroon S. Sheikh
(74) *Attorney, Agent, or Firm* — Seed Intellectual Property Law Group LLP

(57) ABSTRACT

A fuel cell device has a mounting plate on which a fuel cell unit having a predefined number of fuel cells is arranged, the mounting plate and the fuel cell unit comprising media connections for guiding media, in particular for guiding a coolant and for guiding reactants, and electrical contact points for electrically connecting the fuel cell unit to the mounting plate. Further media connections and further electrical contact points are designed or arranged on the fuel cell unit in such a way that the fuel cell unit can be connected or is connected to a second fuel cell unit with a mechanical fluid connection for further guidance of the media and electrical connection for power uptake.

3 Claims, 1 Drawing Sheet

(56) References Cited

U.S. PATENT DOCUMENTS

| | | | |
|---|---|---|---|
| 2006/0093890 A1* | 5/2006 | Steinbroner | H01M 8/248 429/511 |
| 2008/0038594 A1* | 2/2008 | Lai | H01M 8/04992 429/492 |

FOREIGN PATENT DOCUMENTS

| | | |
|---|---|---|
| DE | 10 2008 015 350 A1 | 4/2009 |
| EP | 0 757 398 A1 | 2/1997 |
| EP | 1 846 968 B1 | 9/2010 |
| EP | 3 300 943 A1 | 4/2018 |
| EP | 3 324 476 A1 | 5/2018 |
| KR | 10-2011-0059032 A | 6/2011 |

\* cited by examiner

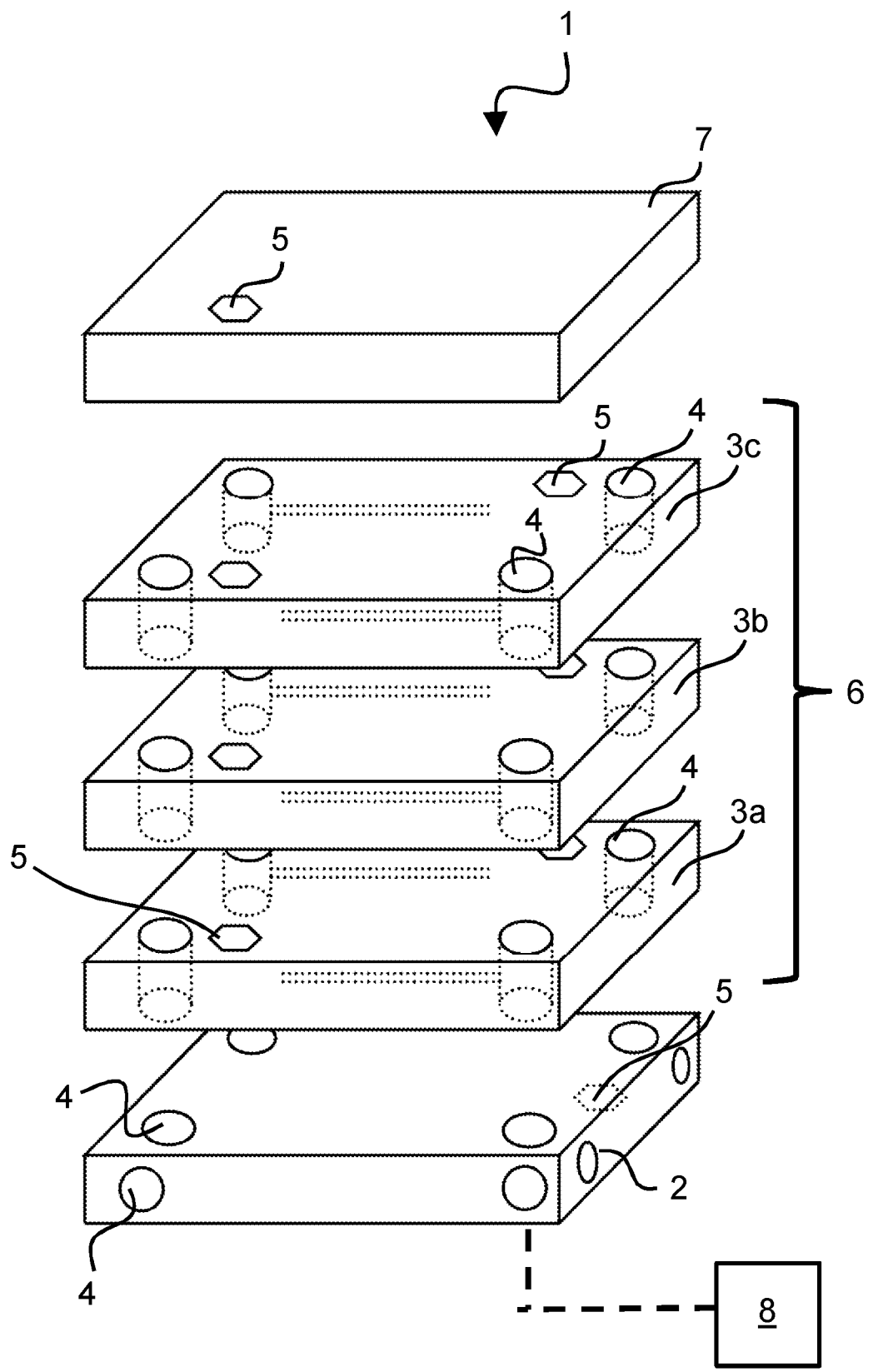

FUEL CELL DEVICE AND METHOD OF MONITORING AND STRUCTURALLY ADAPTING A FUEL CELL DEVICE

BACKGROUND

Technical Field

Embodiments of the invention relate to a fuel cell device with a mounting plate on which a fuel cell unit with a predefined number of fuel cells is arranged. The mounting plate and the fuel cell unit comprise media connections for guiding media, in particular for guiding a coolant and/or for guiding reactants. In addition, the mounting plate and the fuel cell unit comprise electrical contact points for electrically connecting the fuel cell unit to the mounting plate.

Description of the Related Art

Fuel cell devices are used to provide electrical energy in an electrochemical reaction, wherein fuel cell devices, particularly when used in a motor vehicle applications, are subject to varying power requirements and environmental parameters.

A fuel cell module with a plurality of fuel cell stacks is known, for example, from U.S. Pat. No. 9,190,693 B2. In this example, a base plate is provided on which a total of three different fuel cell stacks are distributed. For service purposes, individual fuel cell stacks can be removed from the base plate without inhibiting the operation of the other fuel cell stacks. It is deemed to be disadvantageous that due to the distributed arrangement of the fuel cell stacks on the base plate, only a very limited number of fuel cell stacks can be used, since otherwise the fuel cell module would consume a great deal of installation space. Thus, once a fuel cell system has been constructed, it can only be expanded within very narrow limits.

BRIEF SUMMARY

As described herein, a fuel cell device of the type mentioned above can be flexibly adapted to the desired application conditions. A method for monitoring and structurally adapting a fuel cell device in which such a flexible fuel cell device is used is also described herein.

The fuel cell device is, in particular, characterized by the fact that further media connections and further electrical contact points are designed or arranged on the fuel cell unit in such a way that the fuel cell unit can be connected or is connected to a second fuel cell unit with mechanical fluid connection for further guidance of the media and electrical connection for power uptake. In this way, a modularly expandable fuel cell device is provided, which can be flexibly adapted to the application intended by the respective user. The adaptation is based on historically or empirically determined data on operating parameters of the fuel cell device.

In order to form a particularly compact, modular system, it has proven useful if at least 2 of the fuel cell units are combined into a stack.

One design of the fuel cell device then permits a very simple expansion if the mounting plate is associated with a mounting frame with drawer compartments into which the fuel cell units can be inserted or from which they can be removed, and if the mounting frame is designed with media lines and with electrical lines in such a way that the fuel cell units inserted in the drawer compartments are connected with a mechanical fluid connection and electrical connection to the mounting plate. In so doing, it is not absolutely necessary for the individual fuel cell units to be in direct contact with each other, as the drawer compartments within the mounting frame between two fuel cell units can also remain free as long as there is still a fluid-tight connection between the coolant and the reactants. In addition, there is reliable electrical contact between the individual fuel cell units, so that the fuel cell units may be connected to each other in series.

Alternatively or additionally, it is possible to use a mounting end plate which is in contact with the fuel cell unit arranged furthest away from the mounting plate, and the mounting end plate is tensioned to the mounting plate, in particular in a releasable fashion, by means of at least one tension element. A plurality of fuel cell units can be arranged between the mounting plate and the mounting end plate so that, for example, depending on the installation space within a motor vehicle, an optimized design of the fuel cell device with a stable structure is realized.

In this context, at least one sensor, which is designed to detect a pretensioning force of the at least one tension element, may be present. Depending on this sensor signal, it can thus be ensured that even when a very large number of fuel cell units are used, the stack is pressed together in a fluid-tight manner by means of the tension element and, in particular, the electrical contacts are connected to one another.

In order to be able to record different characterizing variables, such as power requirement, such as operating time, such as speed, etc., a control unit having a memory may be connected in communication with the mounting plate and may be designed to inquire about one or more operating parameters of the fuel cell device and to record a time history of the one or more operating parameters. This control unit can then be read out in the event of servicing and the fuel cell device can then be examined to determine whether the fuel cell device is optimally adapted, i.e., to the behavior of the user.

The method for monitoring and structurally adapting a fuel cell device is characterized by the following steps:
  Detection of one or more operating parameters of the fuel cell device by means of a control device,
  Recording and evaluation of the chronological course of the one or more operating parameters,
  Expansion of the fuel cell device by one or more fuel cell units if the evaluation shows that the power output of the fuel cell device is set out as too limited, or
  Reduction of the fuel cell device by one or more fuel cell units, if the evaluation shows that the power output of the fuel cell device is set out as too large.

For users, this procedure thus opens up the possibility that the fuel cell device can be adapted to the actual conditions of use, based on the data recorded by the control unit. The estimation of the new number of fuel cells, and thus the new number of fuel cell units, can then be done using different parameters, individually or in combination. Under these parameters, the voltage situation of the stack, the pretensioning forces of the stack, the configuration of the drawer compartments for the insertion of the fuel cell units and with regard to the pressure loss of media, for example, air, of the fuel cell device can occur.

If the evaluation of the chronological course of the one or more operating parameters shows that the course lies within a tolerance range, i.e., a tolerance range for at least one of the operating parameters of the fuel cell device is predetermined, then a volume flow of one or more of the media flowing through the mounting plate and the one or more fuel cell units is adjusted for this one operating parameter, without an expansion and reduction of the fuel cell device by one or more of the fuel cell units. It behaves similarly with those components that do not directly contain the fuel cells, such as the anode recirculation fan, the humidifier, the intercooler, and so forth.

In this context, the volumetric flow of the fuel cell device may be adjusted in such a way that the fuel cell device corresponds to an optimum as regards the associated operating parameter, at which the fuel cell device achieves a predetermined maximum power. In so doing, a fine adjustment for the power output of the fuel cell device can thus be achieved.

The at least one operating parameter can be, for example, the power requirement of the fuel cell device. This will generally be lower if there are no large load peaks, for example, because the user of the fuel cell vehicle always only uses limited acceleration or because their driving route is "geographically favorable" since there are no mountains or highway drives during their normal travels. Alternatively or additionally, the at least one operating parameter can also be the operating time of the fuel cell device. Alternatively or additionally, the operating parameter can relate to the velocity profile of the fuel cell device.

BRIEF DESCRIPTION OF THE SEVERAL VIEWS OF THE DRAWINGS

Further advantages, features, and details are provided in the claims, the following description, and the drawing.

FIG. 1 is a highly schematized exploded view of a modular expandable fuel cell device with a stack formed of three fuel cell units and a mounting end plate.

DETAILED DESCRIPTION

In FIG. 1, a fuel cell device 1 is shown in an exploded view comprising a mounting plate 2 on which a first fuel cell unit 3$a$ with a predefined number of fuel cells is arranged. The fuel cell unit 3$a$ may comprise only one fuel cell or may comprise a plurality of fuel cells, for example, 10, 20, or 100 fuel cells. The mounting plate 2 and the fuel cell unit 3$a$ have media connections 4 for guiding media, in this case for guiding reactants, and electrical contact points 5 for electrically connecting the fuel cell unit 3$a$ to the mounting plate 2.

Each of the fuel cells comprises an anode, a cathode, and a proton-conducting membrane separating the anode from the cathode. The membrane is formed of an ionomer, such as a sulfonated tetrafluoroethylene polymer (PTFE) or a perfluorinated sulfonic acid (PFSA) polymer. Alternatively, the membrane may be formed as a hydrocarbon membrane.

A catalyst may additionally be admixed to the anodes and/or the cathodes, wherein the membrane may be coated on its first side and/or on its second side with a catalyst layer of a noble metal or a mixture comprising noble metals such as platinum, palladium, ruthenium or the like, which serve as reaction accelerators in the reaction of the respective fuel cell.

Fuel (e.g., hydrogen) can be supplied to the anode via an anode compartment. In a polymer electrolyte membrane fuel cell (PEM fuel cell), fuel or fuel molecules are split into protons and electrons at the anode. The PEM allows the protons to pass through, but is impermeable to the electrons. For example, the reaction: $2H_2 \rightarrow 4H^+ + 4e^-$ (oxidation/electron release) occurs at the anode. As the protons pass through the PEM to the cathode, the electrons are directed to the cathode or to an energy storage device via an external power circuit.

The cathode gas (e.g., oxygen or oxygen-containing air) can be supplied to the cathode via a cathode compartment, so that the following reaction occurs on the cathode side: $O_2 + 4H^+ + 4e^- \rightarrow 2H_2O$ (reduction/electron uptake).

The particularity of the present fuel cell device 1 is that further media connections 4 and further electrical contact points 5 are designed or arranged on the first fuel cell unit 3$a$ in such a way that the fuel cell unit 3$a$ can be connected or is connected to a second fuel cell unit 3$b$ with a mechanical fluid connection for further guidance of the media and electrically for power uptake. In this way, the fuel cell device 1 is designed as a modular system that can be flexibly adapted to the actual conditions of use of the fuel cell device 1. For this reason, an additional third fuel cell unit is here shown as an example, which in turn can be connected or is connected to the second fuel cell unit 3$b$ by means of mechanical fluid connections 4 for further guidance of the media and electrical contact points 5 for electrical connection for power uptake. The use of further fuel cell units 3$a$, 3$b$, 3$c$ is possible, so that a plurality of fuel cell units 3$a$, 3$b$, 3$c$ may be present in the modular fuel cell device 1. The fuel cell units 3$a$, 3$b$, 3$c$ are combined in the present case to form a stack 6, an example of which additionally shows a mounting end plate 7 which is in contact with the fuel cell unit 3$c$ arranged furthest away from the mounting plate 2 and which tensions the stack 6 to the mounting plate 2 by means of at least one—not shown in greater detail—tension element. Suitable tension elements are straps, rods or the like.

In order to detect a pretensioning force of this tensioning element, a sensor can be provided which transmits its signals to a control unit 8 shown schematically. In the present case, this control unit 8 is connected for communication with the mounting plate 2 and has a memory. The control unit 8 is designed to inquire about one or more operating parameters of the fuel cell device 1 and to record a chronological course of the one or more operating parameters.

In such a case, the fuel cell device 1 can be expanded by one or more fuel cell units 3$a$, 3$b$, 3$c$ if the evaluation of the chronological course of the operating parameters shows that the power output of the fuel cell device 1 is set out as too limited. In the opposite case, if the evaluation shows that the power output of the fuel cell device 1 is set out as too large, the fuel cell device 1 can be reduced by one or more fuel cell units 3$a$, 3$b$, 3$c$.

If it is found that the operating parameters are within a tolerance range; a volume flow of one or more media flowing through the mounting plate 2 and the one or more fuel cell units 3$a$, 3$b$, 3$c$ is adjusted for this one operating parameter, forgoing an expansion and a reduction of the fuel cell device 1 by one or more of the fuel cell units 3$a$, 3$b$, 3$c$.

For example, the power requirement, the operating time or the velocity profile of the fuel cell device 1 used in a fuel cell vehicle can be considered as operating parameters. Other operating parameters are possible.

A particularly suitable expansion possibility, not shown in more detail, is offered by the design of the fuel cell device 1 with a mounting frame associated with the mounting plate 2. In this case, this mounting frame has a plurality of drawer compartments into which the fuel cell units 3$a$, 3$b$, 3$c$ can be inserted or from which they can be removed. Moreover, the mounting frame comprises media lines and electrical lines in such a way that the fuel cell units 3$a$, 3$b$, 3$c$ inserted in the drawer compartments are mechanically connected for fluids and electrically connected to the mounting plate 2.

Embodiments of the present invention are characterized by a modular expansion capability for the fuel cell stack, in particular the fuel cell device 1 with its fuel cell units 3a, 3b, 3c. The fuel cell device 1 thereby provides a modular construction system that can be flexibly adapted to the behavior of the user. Moreover, it can be implemented with limited installation space and at low cost, since the fuel cell units 3a, 3b, 3c may be of identical design.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for monitoring and structurally adapting a fuel cell device including a mounting plate, and a first fuel cell unit having a predefined number of fuel cells, the first fuel cell unit arranged on the mounting plate, wherein the mounting plate and the first fuel cell unit include first media connections for guiding media and first electrical contact points for electrically connecting the first fuel cell unit to the mounting plate, and wherein second media connections and second electrical contact points are designed or arranged on the first fuel cell unit in such a way that the first fuel cell unit can be connected or is connected to a second fuel cell unit in a mechanical fluid connection for further guidance of the media and electrical connection for power uptake, the method comprising:

detecting one or more operating parameters of the fuel cell device by a control device;
   recording and evaluating a chronological course of the one or more operating parameters;
   if the evaluating shows that a power output of the fuel cell device is too limited, then expanding the fuel cell device by one or more fuel cell units; and
   if the evaluating shows that the power output of the fuel cell device is too large, then reducing the fuel cell device by one or more fuel cell units;
   wherein a tolerance range is predefined for at least one of the operating parameters of the fuel cell device, and, for the at least one operating parameter, a volumetric flow rate of one or more of the media flowing through the mounting plate and the one or more fuel cell units is adjusted without expanding and reducing the fuel cell device by one or more of the fuel cell units.

2. The method according to claim 1 wherein the volumetric flow rate of one or more of the media through the fuel cell device is adapted in such a way that the fuel cell device corresponds to an optimum as regards the associated operating parameter, at which the fuel cell device achieves a predetermined maximum power.

3. The method according to claim 1, wherein the at least one operating parameter relates to a voltage level of the fuel cell device, a pretension force of the fuel cell units of the fuel cell device combined to form a stack, or a pressure loss of media within the fuel cell device.

* * * * *